(12) United States Patent
Ford

(10) Patent No.: US 7,798,193 B2
(45) Date of Patent: Sep. 21, 2010

(54) METHOD FOR MANUFACTURE AND INSTALLATION OF SILL DRAINAGE SYSTEM

(75) Inventor: James Scott Ford, Littleton, CO (US)

(73) Assignee: Protecto Wrap Company, Denver, CO (US)

( * ) Notice: Subject to any disclaimer, the term of this patent is extended or adjusted under 35 U.S.C. 154(b) by 920 days.

(21) Appl. No.: 11/556,949

(22) Filed: Nov. 6, 2006

(65) Prior Publication Data

US 2008/0105363 A1    May 8, 2008

(51) Int. Cl.
*B32B 37/00* (2006.01)
(52) U.S. Cl. .................. 156/517; 156/516; 156/544; 156/554; 156/555
(58) Field of Classification Search ............. 156/272.2, 156/555, 71, 510, 516, 517, 544, 554
See application file for complete search history.

(56) References Cited

U.S. PATENT DOCUMENTS

| | | | |
|---|---|---|---|
| 3,454,449 A * | 7/1969 | King | 156/497 |
| 4,180,427 A * | 12/1979 | Bertsch | 156/272.6 |
| 4,557,774 A | 12/1985 | Hoopengardner | |
| 4,775,567 A | 10/1988 | Harkness | |
| 4,849,267 A | 7/1989 | Ward et al. | |
| 5,027,572 A | 7/1991 | Purcell et al. | |
| 5,091,235 A | 2/1992 | Vergnano | |
| 5,218,793 A | 6/1993 | Ball | |
| 5,374,477 A | 12/1994 | Lawless et al. | |
| 5,580,630 A | 12/1996 | Byrd | |
| 5,899,026 A | 5/1999 | Williams et al. | |
| 6,098,343 A | 8/2000 | Brown et al. | |
| 6,305,130 B1 | 10/2001 | Ackerman, Jr. | |
| 6,401,401 B1 | 6/2002 | Williams | |
| 6,401,402 B1 | 6/2002 | Williams | |
| 6,546,679 B1 | 4/2003 | Bushberger | |
| 6,676,779 B2 * | 1/2004 | Hopkins et al. | 156/71 |
| 6,725,610 B2 | 4/2004 | Murphy et al. | |
| 7,022,631 B2 | 4/2006 | Schmid | |
| 2005/0011140 A1 | 1/2005 | Ackerman, Jr. et al. | |
| 2006/0101726 A1 | 5/2006 | Collins | |

OTHER PUBLICATIONS

Carlisle Coatings & Waterproofing, Inc.; product installation instructions; 2002.
Carlisle Coatings & Waterproofing, Inc.; product installation instructions; 2004.

* cited by examiner

*Primary Examiner*—Jeff H Aftergut
(74) *Attorney, Agent, or Firm*—Marsh Fischmann & Breyfogle LLP

(57) ABSTRACT

Disclosed herein are various waterproof membranes that may be applied to a sill surface of an opening in a building structure to waterproof that surface as well as direct water that penetrates through the opening out of the structure. Generally, one or more flexible waterproof membranes are adhesively applied to the sill surface for purposes of waterproofing that surface. Such membranes may further incorporate a back dam structure that is disposed proximate to the rearward edge of a sill plate (i.e., disposed toward the interior of the structure) to direct water towards the front edge of the sill plate (i.e., toward the outside of the structure). Further, such membranes may include wicking material on one or more surfaces to allow for directing water out of a building structure. In various arrangements, one or more flexible membranes may be utilized to create an open fronted sill pan.

13 Claims, 10 Drawing Sheets

METHOD FOR MANUFACTURE AND INSTALLATION OF SILL DRAINAGE SYSTEM

FIELD OF INVENTION

The present invention generally relates to building products and, more particularly, pertains to an impermeable membrane adapted to waterproof a sill surface and a method for forming the membrane.

BACKGROUND OF THE INVENTION

One of the most common failure points for unwanted air and/or moisture in a building envelope is around doors and windows. Controlling air and/or moisture is a serious concern, which may result in exterior and interior damage if not prevented or corrected in a timely manner. In addition, heat losses caused by air leakage around building openings have taken on new significance due to today's high energy costs. Sealing such openings has typically been accomplished by caulking or using putty-like compound around openings between door and window frames to seal the gaps and prevent inward seepage of air and/or water into the building.

In window installations, caulking around the window has been the known installation and application method. However, over several years, such caulking typically cracks, as it cannot withstand the constant expansion and contraction of the window. Some studies indicate that after several years in operation, a majority of all windows will leak through the window flange or the window itself. This water leakage can lead to structural damage such as rotting of the windowsills and mold. Similar problems occur around doors.

Given these problems, there remains a need for an improved method for waterproofing internal components of an opening of a structure and for removing moisture that penetrates into the opening.

SUMMARY OF THE INVENTION

In view of the difficulties in waterproofing openings into building structures, such as door and window openings, provided herein are systems and methods for use in waterproofing sill surfaces of such openings and/or removing water that penetrates into such opening. Generally, the systems and methods discussed herein utilize one or more flexible membranes that are applied to the sill surface for purposes of waterproofing that surface. Such membranes further incorporate a spacer material that may be disposed proximate to the rearward edge of a sill surface (i.e., disposed toward the interior of the structure) when the membrane is applied to the sill surface. The spacer material elevates a portion of the membrane to form a dam/back dam across the width of the sill surface. This elevated portion of the membrane directs any water that is received by the membrane towards the front edge of the sill plate (i.e., toward the outside of the structure). Further, such membranes may include wicking material on one or more surfaces to allow for directing water out of a building structure.

Further, systems and methods (i.e., utilities) are provided for producing flexible membranes including a spacer material. Generally, such utilities are directed to laminating the spacer material onto a waterproof membrane. In one arrangement, the membrane is formed as an adhesive membrane. In such an arrangement, a release liner may be removed from all or a portion of an adhesive surface of the membrane. A resulting exposed adhesive surface may be utilized to adhere the spacer material to the membrane. In another arrangement, an adhesive may be applied to the surface of the spacer material and/or the membrane to adhere the spacer material to the membrane. In such an arrangement, the membrane need not be an adhesive membrane.

The spacer material may be any material having the structural rigidity to maintain a portion of the membrane elevated when a door or window is placed on top of the membrane (i.e., after the membrane and spacer are placed on a sill surface). Such material may include, without limitation, plastics, closed cell foams, open celled foams etc. Generally, it is desirable that the spacer material be formed of a flexible material such that the resulting membrane and laminated spacer is flexible.

While laminating a spacer material directly onto a membrane having an adhesive surface (e.g., an adhesive membrane) provides a convenient method for attaching the spacer to the membrane, it has been recognized by the inventors that some types of spacer materials and adhesive membranes may provide a low level of mutual adhesion. Such low levels of adhesion may result in the unintended de-lamination of the spacer material from the adhesive membrane. In order to improve the level of adhesion between the spacer material and the adhesive membrane, it has been determined that a pre-treatment of the spacer material prior to contact with the membrane may improve the adhesion therebetween.

In some instances, the spacer materials are formed from extruded material. For instance, some closed cell foams are extruded though a die that is cut to a desired cross sectional shape of the resulting foam. During the extrusion process, a release agent may be applied to the die and/or mixed with the raw materials utilized to produce the foam. This release agent in some instances remains on the surface of the foam reducing the ability to bond to that surface. It has also been recognized that many spacer materials, in particular, polymeric materials such as closed-cell foams, may include surfaces that are not well suited for adherence. For instance, plastics and/or polymers typically have a chemically inert and nonporous surface with low surface tensions. These substances are typically non-receptive to bonding/adhesion with other materials. Accordingly, it has been determined that is its desirable to pre-treat (i.e., prior to lamination) at least the contact surface of the spacer material to improve adherence with the membrane.

According to a first arrangement, a system and method (i.e., utility) are provided for producing a laminate assembly including a membrane and a compressible spacer material. The utility includes first and second compressive rollers positioned in a parallel and opposed relationship. The rollers are operative to rotate in a cooperative manner and collectively define an inlet nip leading into the rollers and an outlet nip leading out of the rollers. Accordingly, means (e.g., one or more electric motors) are provided for controllably rotating at least one of the rollers. A first holder is operative to hold a length of a membrane (e.g., a roll of a membrane strip) that includes an adhesive surface, which is covered by a release sheet. A cutter is disposed between the first holder and the inlet nip of the compressive rollers. The cutter is operative to cut through at least a portion of the release sheet as the membrane moves between the first holder and the inlet nip. A second holder is provided for holding a length of spacer material. A surface treater is disposed between the second holder and the inlet nip of the compressive rollers. The surface treater is operative to apply a surface treatment to the spacer material as the spacer material moves from the second holder to the inlet nip of the compressive rollers. Such a surface treatment may improve adhesion qualities of the spacer material. The first and second rollers are further operative to simultaneously receive and contact the membrane and the spacer material at the inlet nip in a known spaced relationship and apply compressive force thereto. Accordingly, the spacer material may be laminated on the adhesive surface of the membrane.

Cutting and/or removing the release sheet as well as treating the spacer material as these materials are drawn into the first and second compressive rollers reduces the number of required steps to form the laminate. That is, cutting and treating these material 'in-line' eliminates the need to prepare these materials in a separate process before they are laminated together.

It has been determined that it is in some instances desirable to provide the membrane and/or spacer material at the inlet nip of the compressive rollers under little or no tension and/or compression. Provision of these materials under little or not tension/compression may reduce shear stresses between these materials after lamination. To reduce stresses on the membrane at the inlet nip, a drive roller may be disposed between the inlet nip and the first holder that is operative to apply pulling forces to the membrane. In this regard, the first drive roller is operative to draw (i.e., under tension) the membrane material from a supply of the membrane and output the membrane to the inlet nip of the compressive roller (i.e., under little or no tension and/or compression). Likewise, a second drive roller may be disposed between the inlet nip and the second holder that is operative to apply a pulling force to the spacer material. Such drive rollers may be operative to be controllably rotated in conjunction with the first and second compressive rollers. In one arrangement, the means for controllably rotating the rollers may include one or more servomotors. Such servomotors may allow the variable speed control of the rollers. In this regard, the speed of the rollers may be ramped up upon initiation of operation and may be ramped down upon termination of operation. Such controlled operation of the rollers upon initiation and termination of operations may reduce sheer stresses (i.e., tension compression mismatches between the materials) in the resulting laminate.

In order to support the membrane and/or spacer material as these materials are fed into the inlet nip of the compressive rollers, one or more support platforms may be utilized to support these materials. For instance, such platforms may have a flat surface for supporting the membrane and/or spacer material as the material proceeds to the inlet nip. Further, such platform(s) may include first and second sidewalls for laterally restraining opposing edges of the materials. In this regard, the platforms may form guide tracks that may be utilized to maintain the lateral positions of the spacer material and the membrane relative to the inlet nip of the compressive rollers such that these materials are supplied to the inlet nip in a known spaced relationship. In one particular arrangement, the cutter may be disposed through a bottom surface of a platform and/or guide track utilized to support and/or laterally restrain the membrane.

The cutter may include any cutting element that allows for cutting through the release sheet. Typically, such a cutter will include a cutting edge that may be disposed between the lateral edges of the membrane in order to form at least a first cut line in the release sheet as the membrane moves to the inlet nip of the compressive rollers. In a further arrangement, first and second cutting edges are disposable between the lateral edges of the membrane. In such an arrangement, a strip of spacer material between the lateral edges of the membrane may be removed from the adhesive surface of the membrane. As will be appreciated, the depth of the cutting edges relative to the membrane and spacer material may be adjustable.

The surface treater may be any device that is operative to improve the surface adhesion qualities of the spacer material. In one arrangement, the surface treater includes a chemical bath through which the spacer material passes. Such a chemical bath may include alcohol (e.g., for removing release agents) and/or acids or other solvents for use in etching the surface of the spacer material in order to improve its adhesion qualities. In another arrangement, a mechanical abrasion device may be utilized to abrade the surface of the spacer material as it proceeds to the inlet nip. In a further arrangement, an electrical surface treatment device is utilized. Such an electrical treatment device may include first and second electrodes that are operative to apply an electrical discharge (e.g., a carona discharge) to a contact surface of the spacer material.

The apparatus may include additional features as well. For instance, one or more sensors (e.g., optical sensors) may be disposed along the pathways of the materials between their supply and the inlet nip of the rollers. Accordingly, upon exhausting a supply of one of these materials the optical sensor(s) may be operative to identify the absence of the material and terminate operation of the lamination process. In a further arrangement, a take-up roller may be utilized that is operative to wind a portion of the release sheet removed from the adhesive surface of the membrane.

In another arrangement, a method for making a laminate assembly is provided. The method includes moving a membrane strip from a membrane supply to the inlet nip of a pair of compressive rollers. At least a portion of a release liner covering an adhesive surface of the membrane may be removed while the membrane moves between the supply and the inlet nip. Such removal is operative to expose at least a portion of the adhesive surface. In conjunction with moving the membrane to the inlet nip of the compressive rollers, a spacer material, which is also formed as a strip, may be moved from a spacer material supply to the inlet nip of the compressive rollers. While moving the spacer material to the inlet nip of the compressive rollers, a contact surface of the spacer material may be treated. Such treatment may improve the adhesion qualities of the spacer material. Accordingly, the membrane and spacer material may be passed between the compressive rollers so that the contact surface of the spacer material is laminated to at least a portion of the exposed adhesive surface. In order to orient the spacer material relative to the exposed adhesive surface of the membrane, it may be desirable to limit the lateral movement of the membrane and/or spacer material relative to the inlet nip.

The step of removing at least a portion of the release liner may include cutting the release liner at a first location across the width of the membrane as the membrane moves between the membrane supply and the inlet nip. This may form a score line or a cut line in the release liner. Accordingly, a portion of the release liner defined by the cut line or score line may be removed prior to the membrane being received at the inlet nip. In a further arrangement, the release liner may be cut at first and second locations across the width of the membrane. In such an arrangement, a strip of the release liner may be removed between the first and second lateral edges of the membrane. As will be appreciated, this results in a strip of adhesive surface being exposed that is situated between first and second release liners remaining on the adhesive surface.

Treating the contact surface may include passing the spacer material through a chemical bath and/or mechanically treating the surface of the spacer material. Such mechanical treatment may result in abrasion of the contact surface and may include the application of electrical energy to the contact surface. In any case, such mechanical abrasion of the contact surface results in a roughened surface that has improved adhesion qualities.

According to another arrangement, a utility is provide wherein a back dam material is connected to a waterproof membrane. In such an arrangement, a spacer material may be disposed on the bottom surface of the membrane in order to provide a back dam along the rearward edge (e.g., inside edge) of a sill surface when the membrane is applied to the sill surface. In such an arrangement, the flexible membrane may be disposed across the length of a generally horizontal sill surface disposed between first and second upright members. The flexible membrane may be of a length that allows a first end portion of the membrane to extend at least partially up the first upright member and a second end portion of the flexible membrane to extend at least partially up the second upright member. To allow for better conformance of the first and second end portions of the membrane to the upright members, the spacer material disposed on the bottom surface of the flexible membrane may be removed from the bottom surface of the first and second end portions. At this time, a release sheet may be removed from at least a portion of the bottom surface of the flexible membrane to expose a bottom adhesive surface, and that bottom adhesive surface may be contacted to the sill surface and/or upright members.

In one arrangement, the spacer material may be disposed across the length of the sill surface between the first and second upright members in order to provide higher elevation at the rearward edge of the sill and thereby provide a positive slope to drain water to the front of the sill and out of the building structure. Accordingly, wicking material may be connected to the top surface of the membrane to improve water flow.

In one arrangement, only a portion of the width of the spacer is initially adhered to the membrane. Such partial adherence may facilitate removal of portions of the spacer from the portions of the membrane that will extend at least partially up the upright members. In such an arrangement, one or more release liners may allow for full adherence of the spacer to the membrane after desired portions of the spacer are removed.

DETAILED DESCRIPTION OF THE INVENTION

Reference will now be made to the accompanying drawings, which at least assist in illustrating the various pertinent features of the present invention. In this regard, the following description that illustrates the use of a flexible membrane to waterproof a sill surface of a window opening is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain the best modes known of practicing the invention and to enable others skilled in the art to utilize the invention in such, or other embodiments and with various modifications required by the particular application(s) or use(s) of the present invention.

Figure 1:
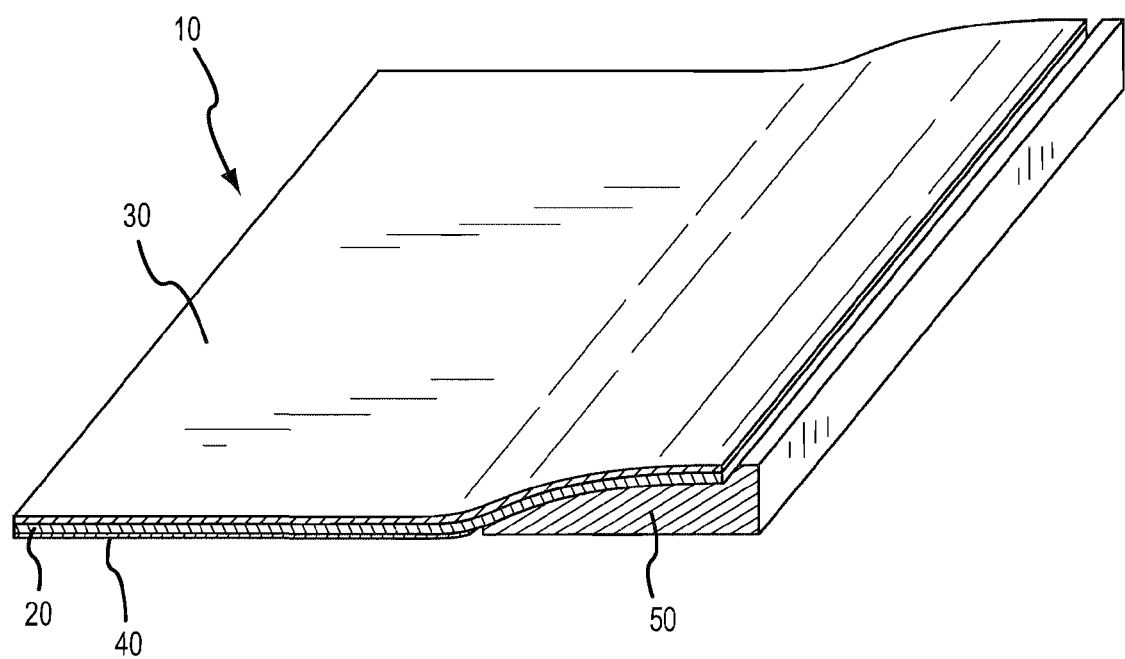
FIG. 1 is a perspective view of a first embodiment of a membrane and spacer material laminate.
Figure 2:
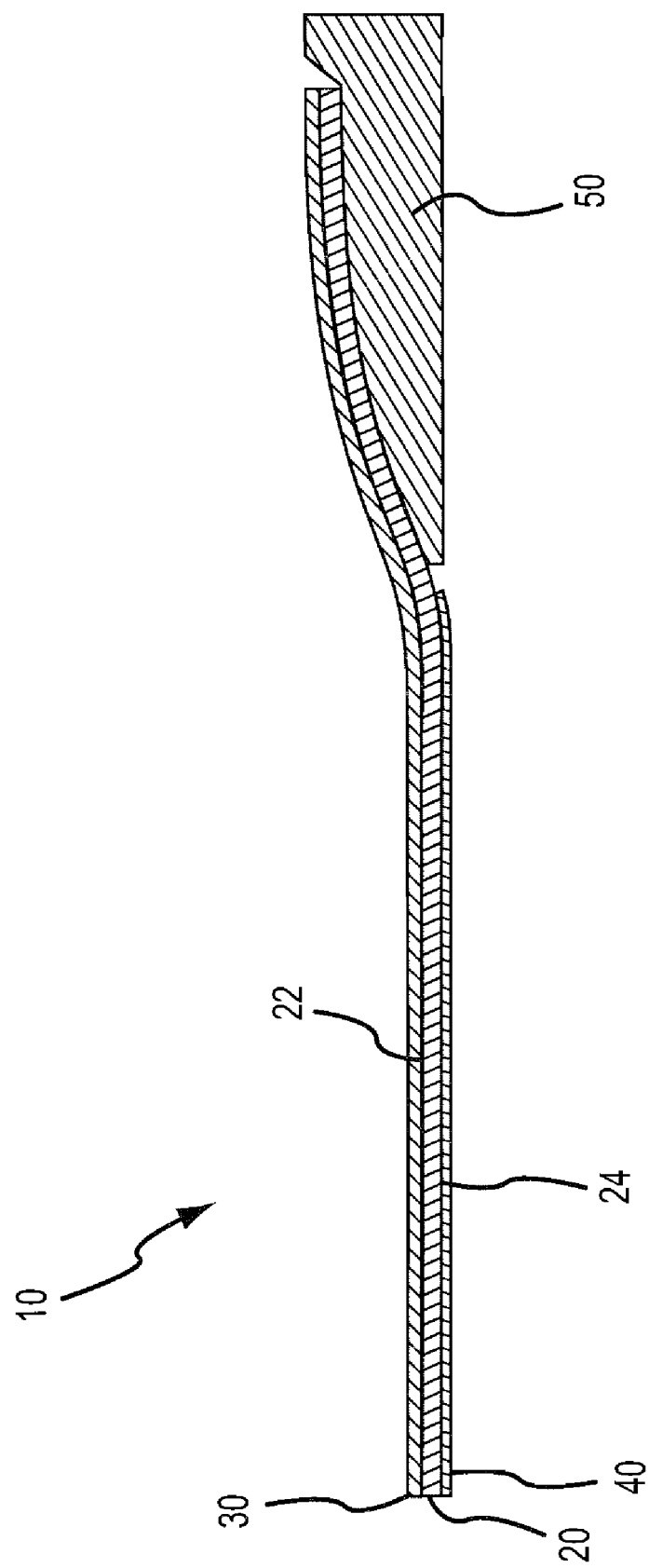
FIG. 2 is a cross sectional view of the laminate of FIG. 1.

FIGS. 1 and 2 illustrate perspective and cross sectional views, respectively, of one embodiment of a membrane 10 in accordance with certain aspects of the present invention. Generally, the membrane 10 is adapted for adhesive interconnection to a surface such that it may provide waterproofing qualities to the surface. Stated otherwise, the membrane provides a substantially impermeable barrier that may be applied to a surface to prevent moisture from contacting that surface. A backdam or spacer material 50 is adhered across a portion of the bottom surface of the membrane 10. The spacer material 50 may, as illustrated, be sloped between its lateral edges to provide a sloped surface over the width of the spacer material 50. The spacer material 50 works to elevate a portion of the membrane 10 when the membrane 10 is applied to a surface. Accordingly, water received on a top surface of the membrane 10 may be directed to the non-elevated portion of the membrane 10. The membrane 10, as shown, also includes a release sheet 40 that is removably interconnected to an adhesive bottom surface 24 of the membrane 10. Removal of the release sheet 40 allows for the membrane 10 to be adhered to a surface.

To further enhance the water directing qualities of the membrane, the membrane 10 may include a wicking material 30 that is attached to at least a portion of a top surface of the membrane 10. However, it will be appreciated that other embodiments of the membrane may not include the wicking material. The wicking material 30 is adapted to move water from a first location on the membrane 10 to a second location via capillary action. As may be appreciated, the use of spacer material 50 and/or the wicking material 30 may facilitate the removal of moisture from a structure, as will be more fully discussed herein.

The spacer material 50 may be any material having the structural rigidity to maintain a portion of the membrane 10 elevated when a structure (e.g., door or window) is placed on top of the membrane (i.e., after the membrane and spacer are placed on a surface). Such material may include, without limitation, plastics, closed cell foams, open celled foams etc. Generally, it is desirable that the spacer material be formed of a flexible material such that the resulting membrane 10 is flexible.

The wicking material 30, when utilized, may be any material that is operative to effect the movement of moisture utilizing capillary action. In one embodiment, the wicking material is formed from an industrial felt. However, it will be appreciated that numerous other natural and synthetic materials may also be utilized.

The membrane 10 may be formed using an adhesive sheet member 20 having first and second opposing surfaces. For purposes of the discussion, the opposing surfaces are referred to as the top surface 22 and bottom surface 24. However, it will be appreciated that other naming conventions may be utilized. The construction of the adhesive sheet member of 20 may be varied. For instance, the adhesive sheet member 20 may be formed from any flexible sheet-like material that provides the desired level of impermeability. For instance, the sheet member 20 may be formed from a plastic sheet and have an adhesive applied to one or both of the top and bottom surfaces 22, 24.

In an alternate arrangement, the adhesive sheet member 20 may be formed of a material that provides both waterproofing properties (e.g., impermeability) as well as adhesive properties. In one embodiment, the adhesive sheet member 20 is formed from a bitumen-containing material. Such bitumen-containing materials may allow a layer of the bitumen-containing layer to provide adhesive qualities for the membrane 10 as well as provide waterproofing qualities for the membrane 10. In another embodiment, the adhesive sheet member 20 is at least partially formed from a rubberized compound (e.g., natural and/or synthetic/butyl rubber). In any embodiment, the adhesive sheet member 20 may itself be a multilayered structure. For instance, the sheet member 20 may be constructed having one or more reinforcing layers (e.g., mesh layers), base sheet layers (e.g., plastic sheet layers) and/or various adhesive layers.

The use of an adhesive sheet member 20 allows for conveniently interconnecting the wicking material 30 to the top surface 22 of the sheet member 20. In this regard, the wicking material 30 may also be formed from a sheet of material and may be applied to an exposed adhesive surface of the sheet member 20 in order to adhere the wicking member to that surface. Typically, the porous structure of the wicking material provides a surface that adheres well to the adhesive sheet member 20. Such application may be performed in a lamination process utilizing compressive rollers as discussed herein. In instances when the wicking material 30 is not utilized, the top surface 22 of the adhesive sheet 20 may be a non-adhesive surface, for example, a plastic sheet layer.

As noted above, a bottom surface 24 of the membrane 10 (i.e., the bottom surface of adhesive sheet member 20) may be adapted for adhesive interconnection to a contacting surface. In this regard, the membrane 10 will typically incorporate the release sheet 40, which is removably interconnected to the bottom surface 24 of the membrane 10. In this regard, the release sheet 40 may be removed from the bottom surface 24 such that adhesive associated with the bottom surface 24 may be contacted with a surface for which waterproofing is desired. Many different foils, films, papers or other sheet materials are suitable for use in constructing the release sheet 40. For example, the release sheet 40 may be formed from metals, plastics, or papers treated with silicon or other substances to provide a low level of adhesion to the underlying adhesive associated with the sheet member 20. In any case, it is desirable that the release sheet 40 be easily removable from the adhesive sheet 20.

Figure 3A:
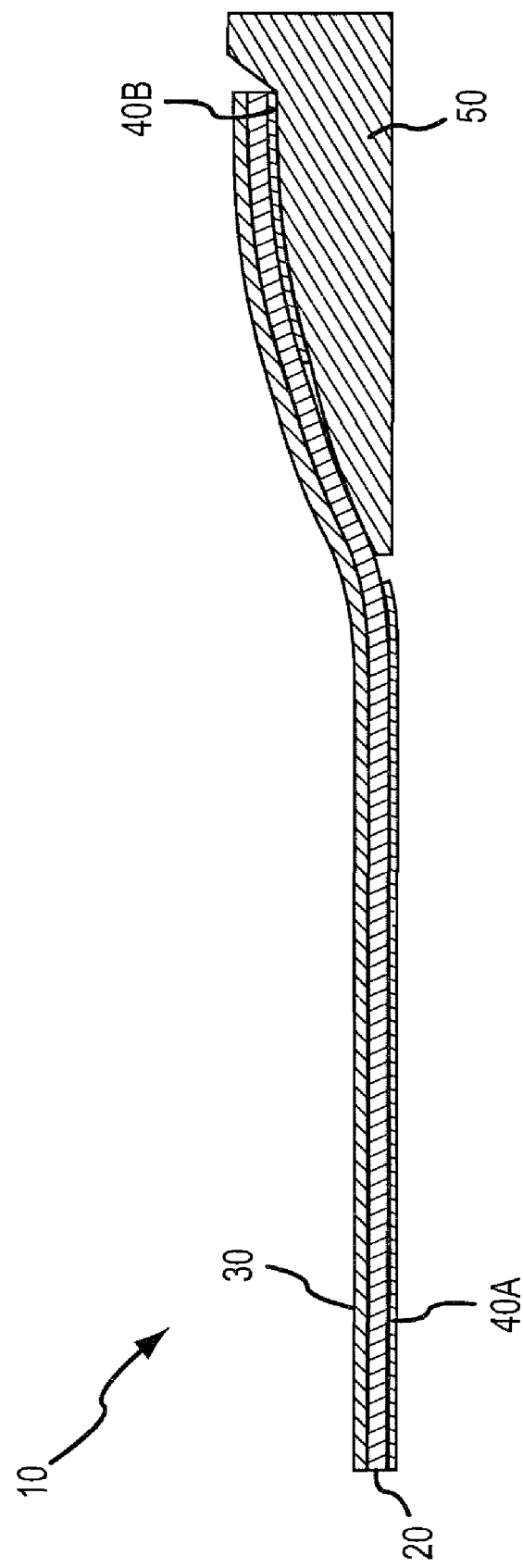
FIGS. 3A and 3B are cross sectional views of a second embodiment of a laminate including a membrane and spacer material.
Figure 3B:
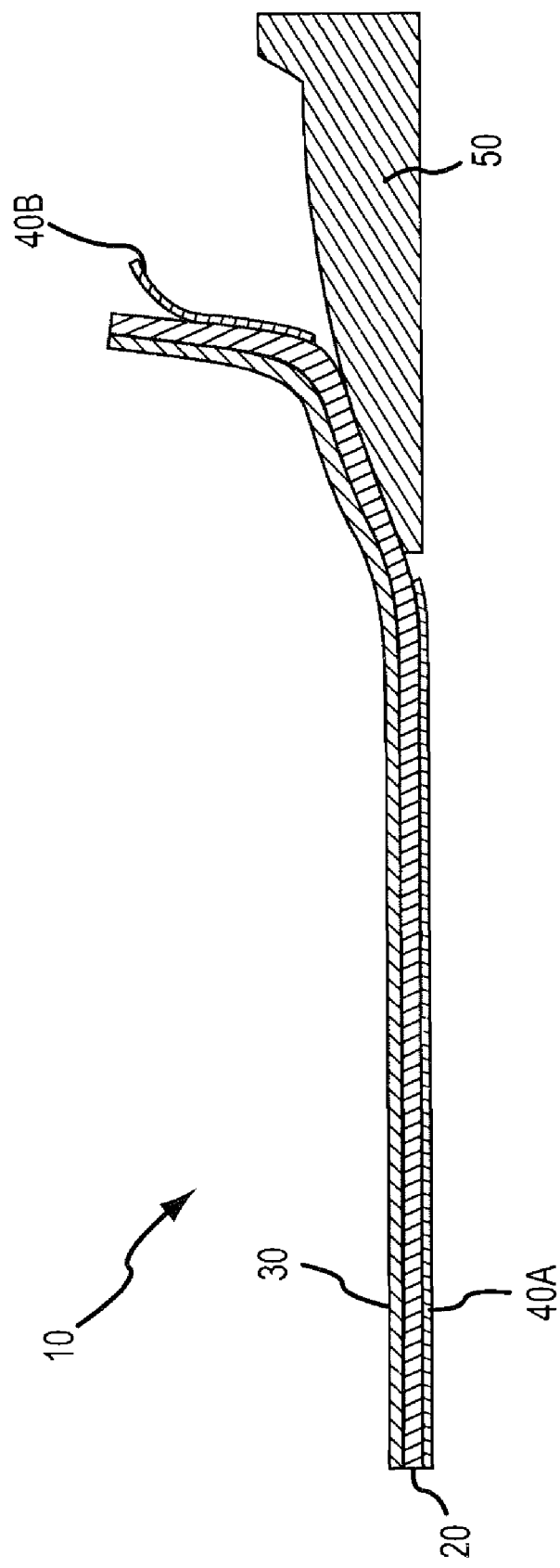

FIGS. 3A and 3B illustrates a further embodiment of a membrane 10 that incorporates a spacer material 50. In this embodiment, only a portion of the width of the spacer material 50 is adhered to the bottom surface 24 of the adhesive sheet member 20. Such partial adherence may facilitate removal of the spacer material 50 from one or more section of the adhesive sheet member 20. For instance, in some applications it may be desirable to remove the spacer material 50 from one or more portions of the membrane 10. To achieve such partial adherence, a strip of the release sheet 40 between the may be removed from the bottom surface 24 of the sheet member 20 prior to lamination, as will be discussed herein. This results in a membrane 10 having first and second release sheets 40A and 40B. The first release sheet 40A may be removed to expose an adhesive surface that is utilized to adhere the membrane 10 to a surface, as discussed above. The second release sheet 40B may be removed such that the adhesive sheet member 20 may be adhered across the width of the spacer material 50 once desired portions of the spacer material 50 are removed (not shown). In this regard, the sheet member 20 may be lifted form the surface of the spacer material 50 to allow removal of the second release sheet 40B from the bottom surface of the adhesive sheet member 20. Of note, the adhesive sheet member 20 and/or wicking material 30 may not extend entirely over the top surface of the spacer material 50. Further, in all embodiments the spacer material 50 may incorporate an upward projection 52 that extends above the adhesive sheet member 20 and/or wicking material 30.

Figure 4:
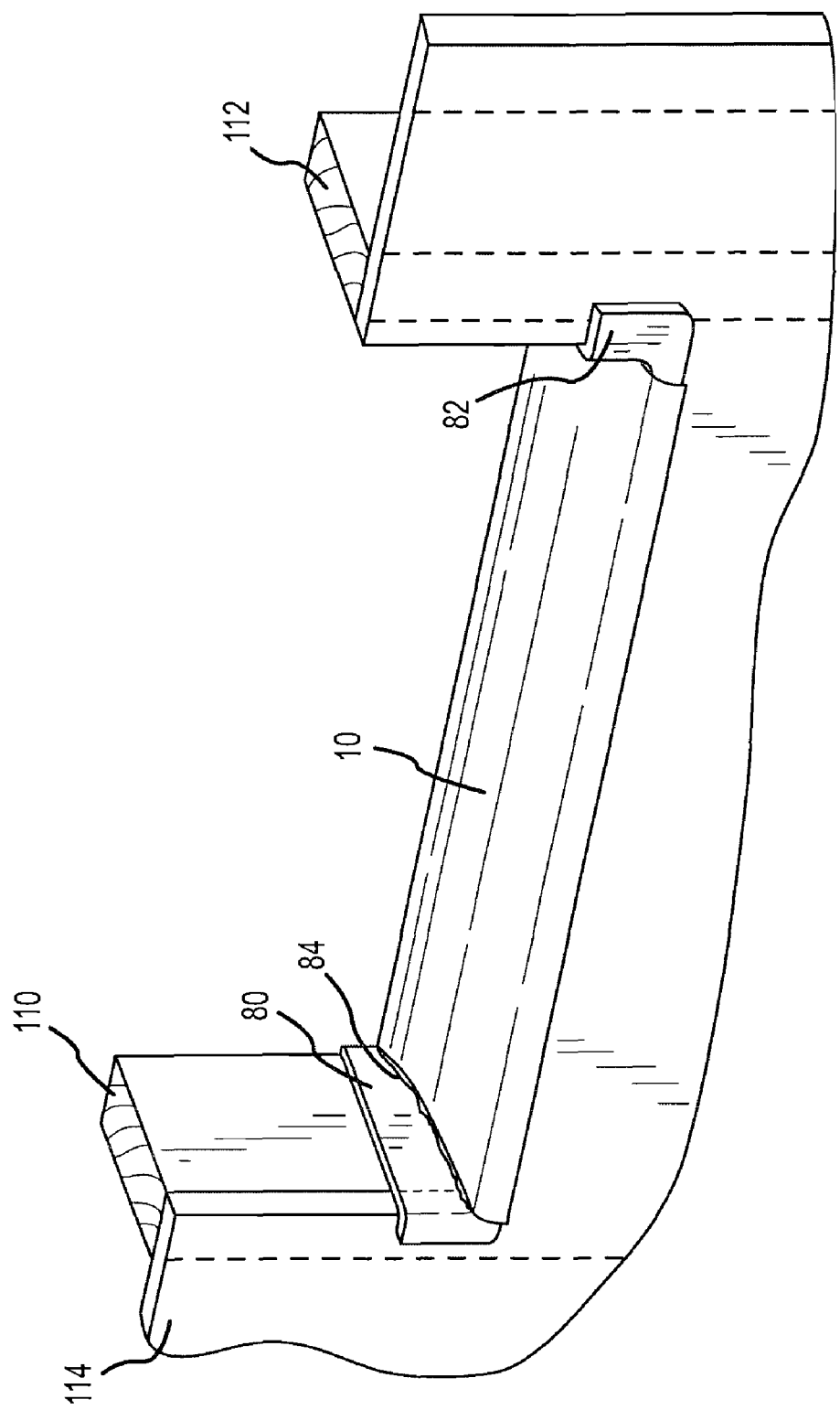
FIG. 4 illustrates a perspective view of the laminate of FIG. 1 being utilized to form a sill pan within a window opening.

FIG. 4 illustrates one embodiment where the flexible membrane 10 is utilized to waterproof a sill surface of a window opening while providing an elevated backdam. As shown in FIG. 4, first and second flexible waterproof membranes 80, 82 may be applied to the bottom inside corners of a window opening. As shown, a first flexible membrane 80 is adhered to the top surface of a windowsill (which as illustrated is covered by membrane 10) and a side surface of a corresponding stud 110. In this regard, the flexible membrane 80 seals the interface between the stud 110 and windowsill. Likewise, a second flexible membrane 82 is adhered to the windowsill and the opposing stud 112. The membranes 80, 82 may extend from the rear edge of the windowsill, across the width of the windowsill and across sheathing 114 attached to the front surfaces of the studs 110, 112. Further, the membranes 80, 82 may extend a distance beyond the sheathing 114. As shown in FIG. 4, the portions of each membrane 80, 82 that extend beyond the sheathing 114 may be pulled and adhered to the outside surface of the sheathing 114. In this regard, it may be desirable that the membranes 80, 82 be formed of a highly elastic material that permits their conformance to the inside corners of the opening as well as their molding to the outside surface of the sheathing 114. In one arrangement, the membranes 80, 82 are non-reinforced membranes. For instance, the membranes 80, 82 may be formed of a butyl rubber compound or a bituminous compound that has little or no internal reinforcement to enhance the flexibility of the membranes 80, 82.

Once the membranes 80, 82 are affixed to the inside corners of the opening, the membrane 10 may be disposed across the surface of the windowsill. In this regard, the membrane 10 may be measured and cut to the length of the windowsill as measured between the studs 110, 112. Once cut to length, the spacer material 50 may be positioned across the rearward edge of the sill surface and the release sheet may be removed from the bottom surface of the membrane 10 in order to adhere the membrane 10 to the windowsill.

In such an arrangement, the bottom surface of the membrane 10 is adhered to the top surface of the windowsill as well as to the top surfaces of the corner membranes 80, 82. Generally, the overlap and adherence between the membrane 10 and the corner membranes 80, 82 will provide a substantially waterproof interface. However, it may also be desirable to utilizing a sealant along the interface to further enhance waterproofing. For instance, appropriate caulking compound or sealant may be utilized to seal the interface/seam between membranes. In one arrangement, a bead of caulk 84 may be applied to the interface/seam between the flexible membrane 10 and the corner membranes 80, 82. In applications where the corner membranes 80, 82 are not utilized, use of a sealant at the interfaces between the ends of the membrane 10 and the studs 110, 112 is advisable to prevent infiltration of water beneath the membrane 10.

A forward edge of the membrane 10 may be folded over the outside surface of the sheathing 114. At this time, a window (or door) may be placed on the top surface of the membrane 10. The spacer material 50 forms a back dam or elevated area along the rearward edge of the windowsill 116 that prevents water from infiltrating into the opening. Accordingly, when the windowsill 116 is covered by a membrane, a forward edge of the membrane extending over the outside surface of the sheathing 114 will typically be at a lower elevation than the portion of the membrane 10 disposed over the spacer material 50. Accordingly, the downward slope and/or the wicking material 50 provide a flow path away from the rear of the sill 116 such that water may be directed out of the opening.

Figure 5:
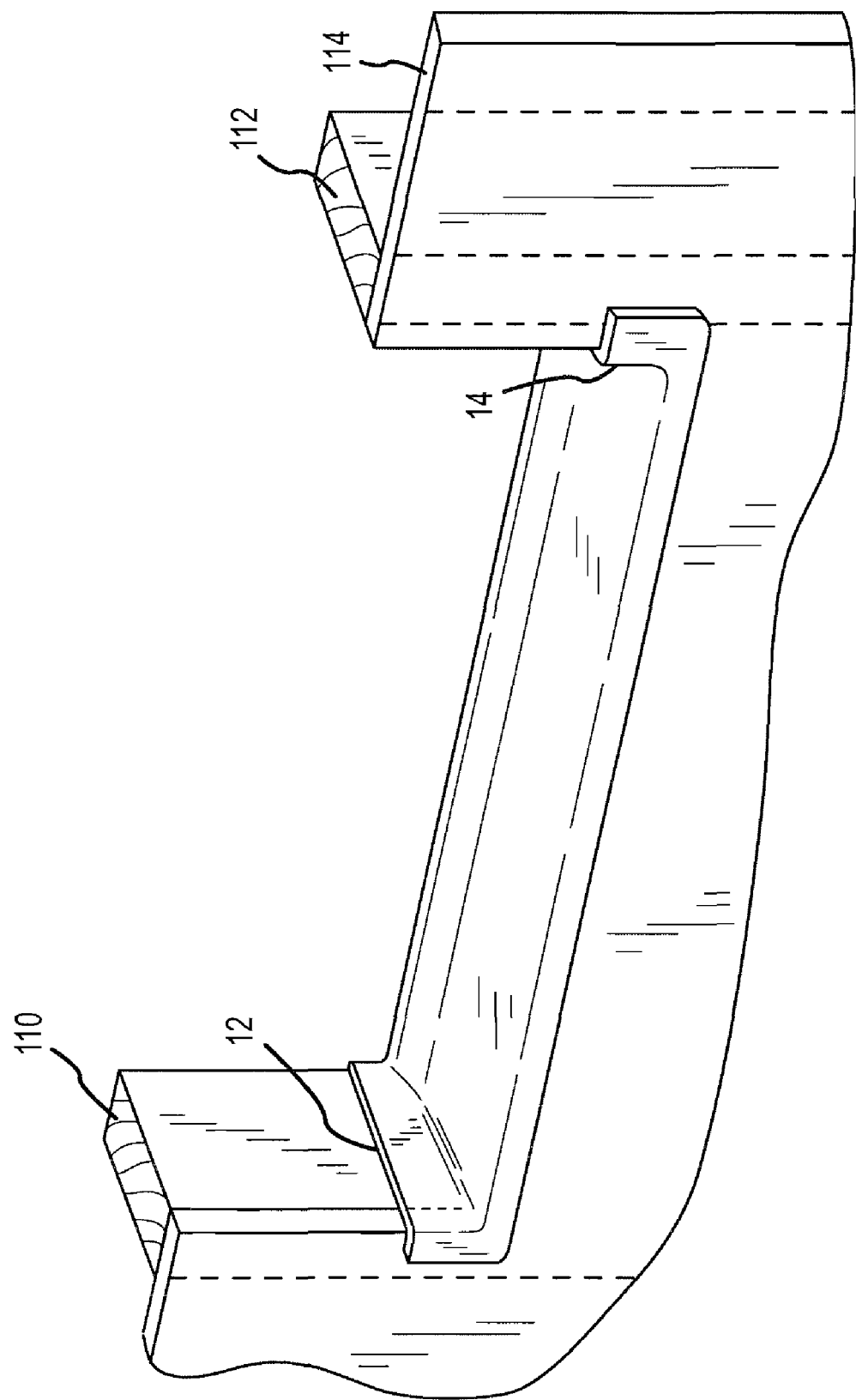
FIG. 5 illustrates a perspective view of the laminate of FIG. 1 being utilized to form a sill pan within a window opening.

In another arrangement, the membrane 10 may be utilized without the use of corner membranes. As shown in FIG. 5, first and second opposing end portions 12 and 14 of the membrane are disposed partially up the studs 110, 112, respectively, when the membrane 10 is disposed on a sill surface. In this regard, the first and second end portions 12, 14 may be adhered to the studs 110, 112 when the release liner is removed from the bottom surface of the membrane 10. To facilitate disposal of the first and second end portions 12, 14 adjacent to the studs 110, 112, the spacer material may be removed form the bottom surface of these end portions 12, 14 of the membrane 10. That is, in instances where the membrane 10 extends partially up the upright members of a window opening, it may be desirable to remove the spacer material 50 from those portions of the membrane 10. The remainder of the membrane 10, may include the spacer material such that a back dam is formed along a rearward edge of the windowsill.

In any embodiment, the elevation of the rearward portion of the membrane and/or the wicking material allows for removing water from a sill surface. Further, the impermeability of the membrane 10 prevents water from contacting the generally wooden sill surface. This combination of the water removal and waterproofing properties may prevent structural damage of the sill surface and lessen the likelihood of mold forming within the walls of a completed structure.

Figure 6:
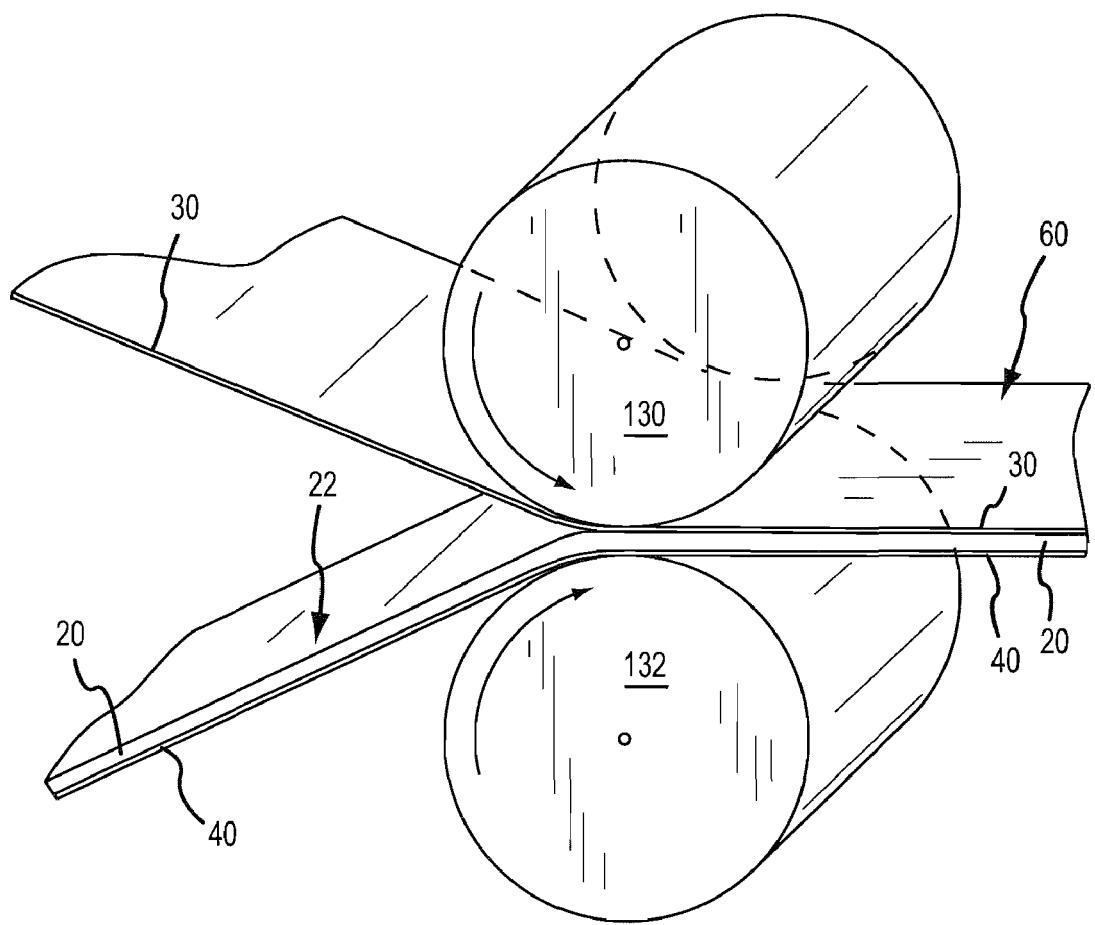
FIG. 6 illustrates a process for laminating a wicking material onto a membrane.
Figure 7:
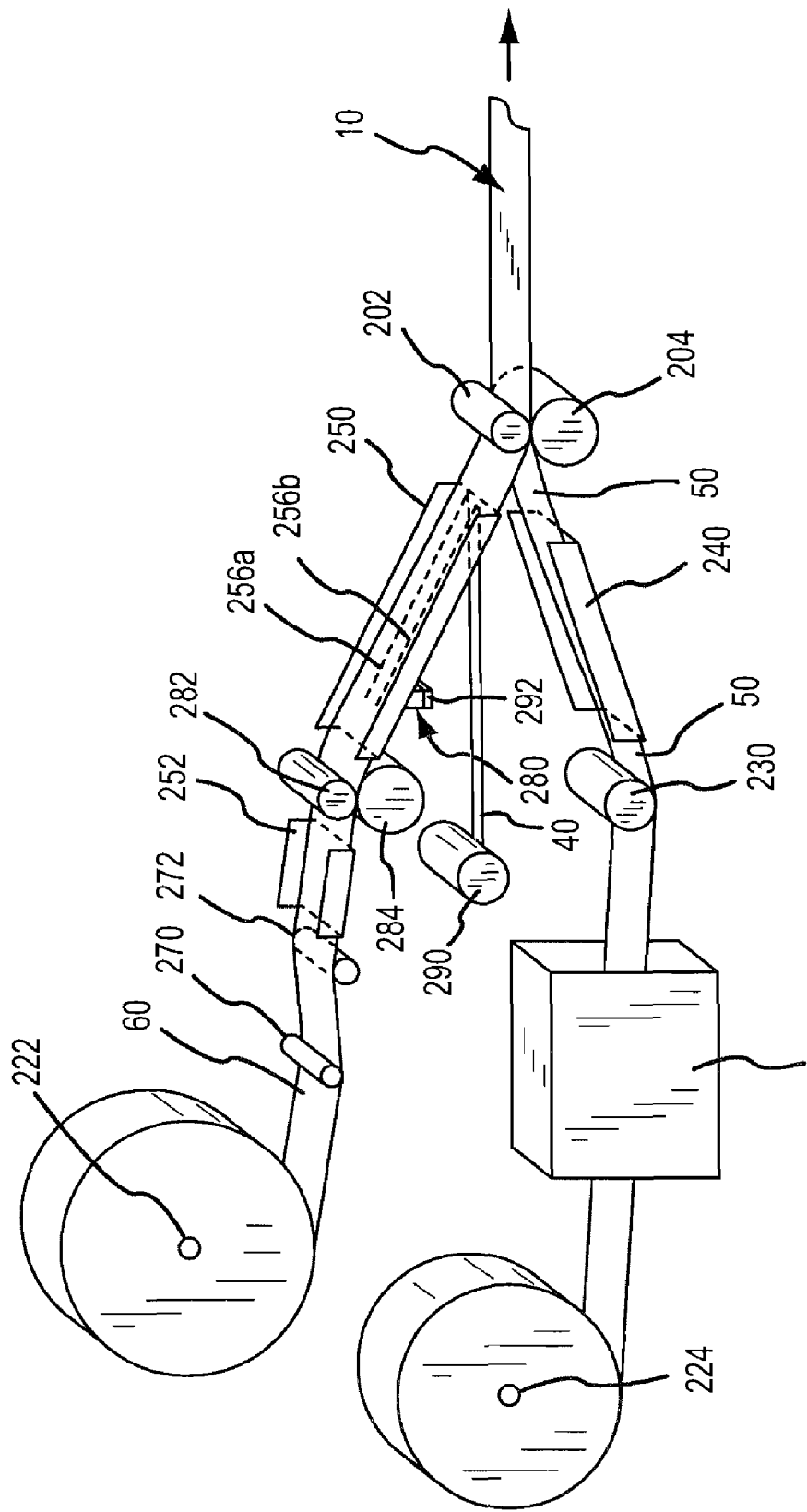
FIG. 7. illustrates an apparatus for forming the laminates of FIGS. 1-3.
Figure 8:
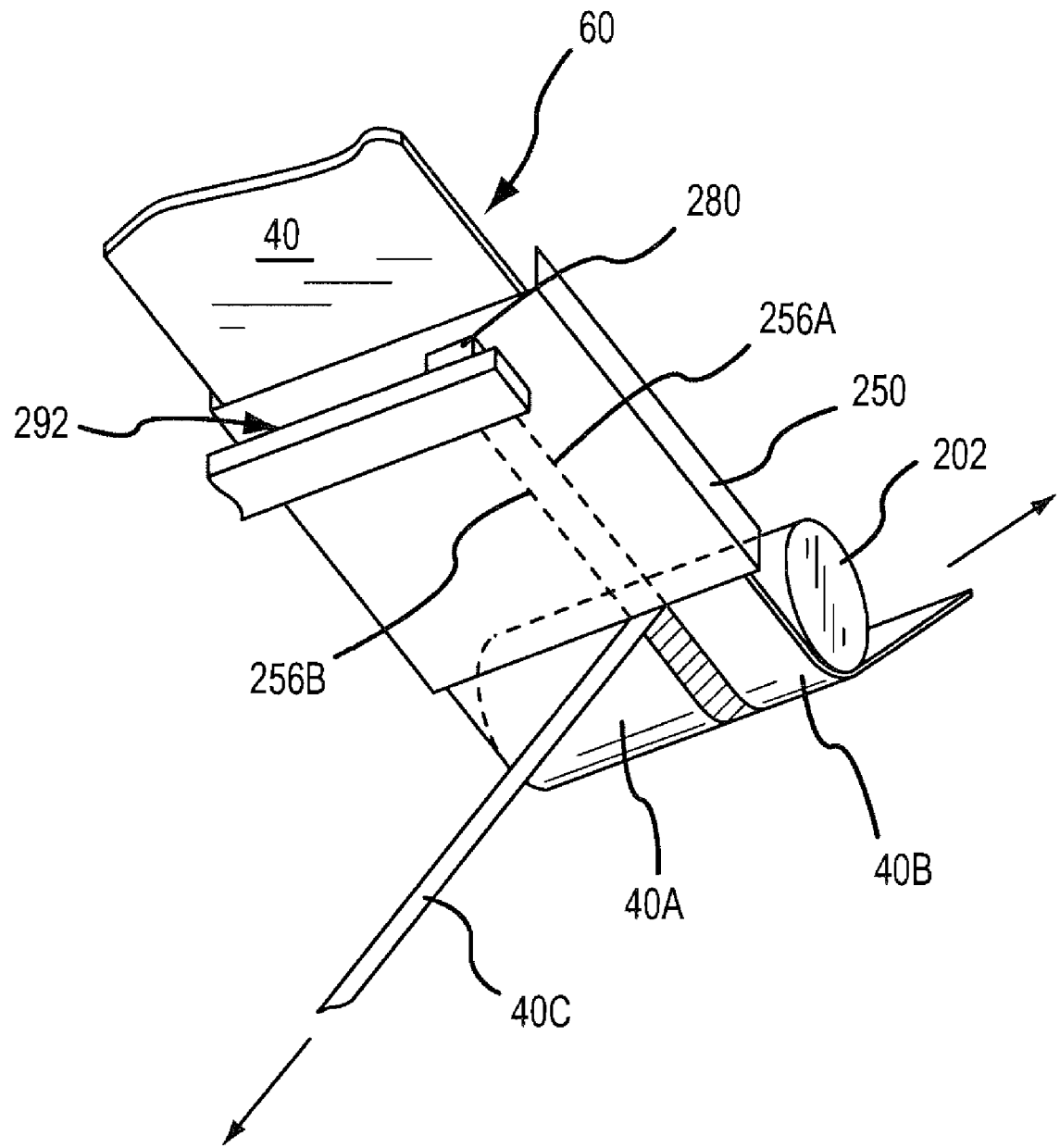
FIG. 8 illustrates the removal of a portion of a release sheet from an adhesive surface of a membrane.

FIGS. 6-8 illustrate systems and methods for use in producing the membrane 10 incorporating the spacer material 50 discussed above. Generally, the apparatus is operative to laminate spacer material onto a surface of the adhesive sheet member 20. This process is performed in an in-line process where the respective materials are continuously drawn from a supply and compressed/laminated together. However, in the present arrangement, prior to adhering spacer material 50 to the adhesive sheet member 20, the wicking material 30 is laminated to a first surface of the adhesive sheet member. That is, the wicking material 30 may be laminated to the adhesive sheet member 20 in a separate in-line process. However, it will be appreciated that such lamination could occur in the same in-line process during which the spacer material 50 is laminated to a surface of the adhesive sheet member 20. One process for in-line lamination of a flexible membrane with a spacer material is set forth in co-owned U.S. Pat. No. 6,676,779 entitled "Air and moisture barrier laminate apparatus" the contents of which are incorporated herein by reference.

FIG. 6 illustrates the lamination of the wicking material 30 to an exposed adhesive surface of the adhesive sheet member 20. As shown, a supply of the wicking material 30 (i.e., a sheet/strip) and a separate supply of the adhesive sheet member 20 are supplied to an inlet nip of a pair of marriage or lamination rollers 130, 132. Generally, one of the rollers 130 or 132 is a drive roller that is operatively interconnected to an electric motor such that it may be controllably rotated. The other roller forms a mating or compression roller that is free to rotate about its central axis. When the wicking material 30 and adhesive sheet member 20 are disposed between the rollers 130, 132, these materials may be compressed between the rollers 130, 132. Further, the controlled rotation of one of the rollers (or possibly both rollers) is operative to draw the wicking material 30 and adhesive sheet member 20 through the rollers and compress the wicking material 30 and adhesive sheet member 20 together. In this regard, the rotation of the drive roller may be translated to the mating/compression roller.

It will be appreciated that the surfaces of the rollers 130, 132 may include any appropriate coating. For instance, the surface of one or both rollers 130, 132 may be tackified (e.g., rubberized) and/or textured in order to allow the rollers to grip the wicking material 30 and/or adhesive sheet member 20 in order to draw these materials between the rollers. Additionally or alternatively, the rollers 130, 132 may contain a suitable nonstick coating and/or spray-on release agents to lessen or prevent adherence of materials to the rollers 130, 132.

The lamination rollers 130, 132 define a compressive inlet nip therebetween. When the rollers 130, 132 are rotating as indicated by the arrows in FIG. 6, they are operative to receive the wicking material 30 and adhesive sheet member 20 draw or pull the materials between the rollers and thereby compress these materials together. As shown, the top adhesive surface 22 of the adhesive sheet member 20 is exposed prior to entry into the inlet nip of the lamination rollers 130, 132. Upon passing through the compressive rollers 130, 132 the wicking material 30 is compressed against the adhesive top surface 22 of the sheet member 20. Accordingly, the wicking material 30 is adhered/laminated to the adhesive sheet member 20 across its width. As shown, the adhesive sheet member 20 further includes a release liner 40 attached to its bottom adhesive surface. After lamination, the resulting combined membrane 60 formed of the wicking material 30, the sheet member 20 and the release sheet 40 may be utilized to form the membrane 10 that incorporates spacer material 50. In this regard, the wicking material 30, adhesive sheet member 20 and release sheet 40 may be stored in a roll for further processing, as discussed herein.

FIG. 7 illustrates a laminating apparatus that is operative to laminate spacer material 50 onto the bottom surface of an adhesive sheet member including the combined membrane 60. As shown, the apparatus 200 includes plurality of rollers that are held in a fixed positional relationship for aligning and/or compressing/laminating the combined membrane 60 and spacer material 50. Each of the rollers is operative to rotate about its center axis. In this regard, an axle extending through such center axis may be attached to a frame of the apparatus (not shown).

The apparatus 200 includes a pair of lamination rollers 202, 204 that are operative to receive and apply compressive force between a surface of the combined membrane 60 and the spacer material 50 in order to generate the membrane 10. As discussed in relation to FIG. 5, the lamination rollers 202, 204 may include a drive roller and a compression roller. Further, it will be appreciated that these rollers 202, 204 may be adjustable such that the distance between their surfaces may be increased or decreased in order to apply more or less compressive force therebetween. Various other rollers, guide tracks and spindles are utilized to orient the combined membrane 60 and spacer material 50 at the inlet nip of the lamination rollers 202, 204. In the arrangement shown, a supply roll of the combined membrane 60 and a supply roll of the spacer material 50 are held on spindles 222, 224. Such an arrangement allows the materials to be drawn into the apparatus when one or more drive rollers is controllably rotated.

Reference will now be made of the path each of the materials (i.e., combined membrane and spacer material) taken from their supply rolls to the inlet nip of the lamination rollers 202, 204. As shown, the spacer material 50 is drawn from a supply roll disposed on a first spindle 224. Initially, the spacer material passes through a pretreater 300. This pretreater 300 prepares a surface of the spacer material 50 for adhesion to the adhesive surface of the sheet member 20, as will be further discussed herein. After passing through the pretreater 300, the spacer material 50 passes beneath a drive roller 230, through a guide track 240 and then to the inlet nip of the lamination rollers 202, 204. The drive roller 230 is operative to pull the spacer material from the supply and through the pretreator 300. The speed of the drive roller 230 is individually adjustable. However, in one arrangement the drive roller 230 is controlled to output spacer material 50 at substantially the same speed as the spacer material is drawn into the inlet nip of the lamination rollers 202, 204. In this regard, the spacer material 50 disposed between the drive roller 230 and the lamination rollers 202, 204 may be under little or no tension.

The guide track 240 maintains proper alignment of the spacer material 50 relative to the inlet nip of the lamination rollers. As shown, the guide track 240 is positioned between the drive roller 230 and the inlet nip of the lamination rollers 202, 204. The guide track 240 provides a support platform having a generally flat, smooth surface over which the spacer material 50 may pass, as well as first and second vertical sidewalls that are spaced to engage the lateral edges of the spacer material 50. Accordingly, after the spacer material 50 passes beneath the drive roller 230 and is received within the guide track 240, the lateral position of the spacer material 50 relative to the inlet nip of the lamination rollers 202, 204 is fixed. Similar guide tracks are utilized to maintain the lateral position of the combined membrane 60 as it is drawn into the inlet nip of the lamination rollers 202, 204. Accordingly, the relative positions of the combined membrane 60 and spacer material 50 remain may fixed as presented to the inlet nip of the lamination rollers 202, 204. In this regard, the position of the spacer material 50 as laminated onto the combined membrane 60 may be fixed.

Similar to the spacer material 50, the combined membrane 60 is drawn from a supply roll disposed on a second spindle 222. Specifically, a pair of drive/pull rollers 282, 284 are adapted to pull the membrane from the spindle 222. The pull rollers 282, 284 may output the combined membrane at a rate equal to the intake of the membrane 60 by the lamination rollers. Again, this may allow providing the membrane 60 at the inlet nip of the lamination rollers 202, 204 under little or no tension. The combined membrane proceeds under a first tensioning bar 270, over a second tensioning bar 272, through a first guide track 252, through the pulling rollers 282, 284, through a second guide track 250 and into the inlet nip of the lamination rollers 202, 204. Of note, as the combined membrane 60 passes through the second guide track, a cutter 280 is utilized to form cut or score lines 256a, 256b through the release sheet disposed on the bottom surface of the combined membrane 60. These score lines 256a, 256b define a portion of the release sheet 40 (i.e., a strip in the embodiment shown) that may be removed from the bottom surface of the combined membrane 60.

Referring to FIGS. 7 and 8, it will be appreciated that in order to remove a strip of the release sheet, the cutter 280 is formed of first and second cutting edges (e.g., blades) that are operative to form the first and second score lines 256a, 256b. Accordingly, the portion of the release sheet 40C disposed between the first and second score lines 256a, 256b may be removed from the bottom surface of the combined membrane 60 in order to expose an adhesive surface thereof. In this regard, the release sheet 40 is separated into a first and second release sheets 40A, 40B that remain on the bottom surface of the combined membrane 60 that are separated by an exposed adhesive surface.

As shown, the cutter 280 is supported by a carrier bar 292 that is mounted substantially perpendicular to the travel direction of the combined membrane 60. The carrier bar 292 supports the cutter 280 (e.g., blade) and allow for the cutter to be selectively positioned along the length of the carrier bar 292 so that the cutter(s) 280 may cut the release sheet 40 at any point across the width of the combined membrane 60. Further, the adjustable holder 294 may allow for adjustment of cutter depth. In this regard, the cutter(s) may be adjusted such that they score or cut most of the way through the release sheet without damaging the underlying membrane.

After scoring the release sheet 40, the portion of the release sheet 40C that is to be removed from the bottom surface of the combined membrane is removed as the combined membrane 60 passes over the end of the guide track 250. In this regard, the removed portion of the release sheet (i.e., 40C in the present embodiment) is taken up on a take-up roller 290. See FIG. 7. This take up roller 290 is operative to wind the removed release sheet at the same speed that the membrane is drawn into the lamination rollers 202, 204.

After the portion of the release sheet is removed from the bottom surface of the combined membrane, the membrane 60 continues to the lamination rollers 202, 204 where at least a portion of the spacer material 50 is aligned with the exposed adhesive surface on the bottom of the combined membrane 60. Accordingly, after the spacer material and combined membrane 60 pass through the lamination rollers 202, 204, the spacer material 50 is adhered to the exposed adhesive surface to generate the combined membrane 10, as discussed above in relation to FIGS. 1-5. It will be appreciated that in some instances, a single cutter may be utilized, and a single portion of the release sheet 40 may be removed, leaving a single, base sheet covering a single portion of the bottom of the combined membrane 60. In such instances, the entirety of the width of the spacer material 50 may be adhered to the combined membrane 60 (See FIG. 2 for example). In other arrangements, first and second cutters (e.g., blades) may be utilized such that a middle portion of the release sheet 40 is removed between the lateral edges of the combined membrane 60. In such instances, less than all of the width of the spacer material 50 may be initially adhered to the combined membrane 60.

By providing the combined membrane 60 and the spacer material 40 to the lamination rollers 202, 204 under little or no tension, improved lamination is achieved. That is, as neither material is stretched or compressed upon lamination, there is little or no shear stress between the adhered portions of the materials 60, 50 that could result in delamination.

Figure 9:
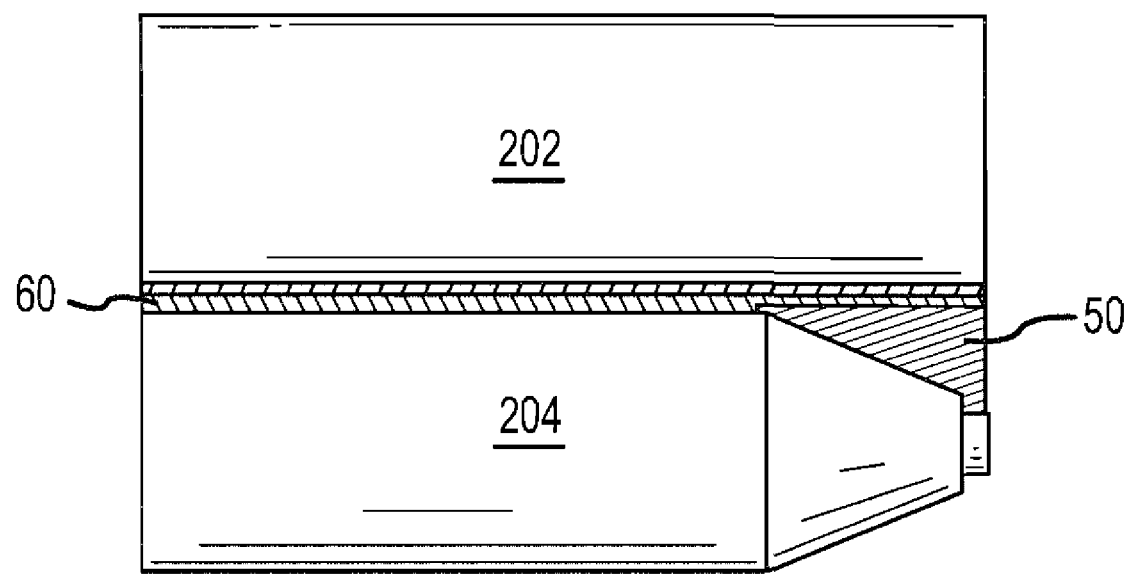
FIG. 9 illustrates a pair of contoured rollers that may be utilized to laminate the membrane and spacer materials.

FIG. 9 illustrates an end view of the lamination rollers 202, 204. As shown, one of the rollers may be a shaped roller that at least partially corresponds to the shape of the spacer material 50. In this regard, it will be appreciated that the portion of the resulting membrane 10 that includes the spacer material 50 is thicker than the remainder of the membrane 10. In this regard, it may be desirable to utilize a shaped roller 204 such that substantially even compression may be applied across the width of the membrane during manufacture.

As noted above, the spacer material 50 passes through a pretreater 300 prior to being laminated to an adhesive surface of a membrane. In this regard, it has been recognized that many spacer materials, in particular, closed-cell foams, may include surfaces that are not well suited for adherence. For instance, many extruded foams include a release agent within their mixture and/or that is applied to a die utilized to extrude the foam. Such release agent may reduce the ability to adhere foam to other surfaces. Further, it will be recognized that plastics and/or polymers typically have a chemically inert and nonporous surface with low surface tensions. That is, these substances are typically non-receptive to bonding with other materials. Accordingly, as spacer materials are often extruded and/or made of plastics and polymers, if left untreated prior to lamination, the spacer material 50 may delaminate from the membrane. Accordingly, it has been determined that is its desirable to pre-treat (i.e., prior to lamination) at least the contact surface of the spacer material to improve adherence with the adhesive sheet member.

In one arrangement, the pretreater includes a bath and squeegee system that allows for alcohol, acids or other chemicals to be applied to the surface of the spacer material and then removed. Such treatment may allow for removing release agents from the surface of the spacer material 50 and/or for etching the surface (e.g., roughening the surface) of the material to improve adhesion qualities.

In another arrangement, the pretreater includes a carona treatment process. In this regard, a carona surface treatment may be utilized to improve the adhesion of the surface of the spacer material. The carona treating system is designed to increase the wettability and adhesion of a surface of the spacer material. Typically, the system includes two components—a power supply and a treater station. The power supply accepts electrical power and converts it into single-phase high frequency power that is supplied to the treater station. This power is then applied to the surface of the spacer material through an air gap by a pair of electrodes (not shown). Typically, one of the electrodes is disposed above the surface of the spacer material, and the other electrode, formed as a roller, supports the spacer material relative to a ground potential. The side of the spacer material facing the electrode receives the electrical discharge energy as the material is drawn over the support roller. Typically, after such treatment, the surface of the spacer material 50 is roughened to allow for improved adhesion to the bottom surface of the combined membrane 60. As will be appreciated, performing a surface treatment of the spacer material in-line simplifies the process of forming the membrane 10.

While the invention has been described with reference to various illustrated embodiments, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

The invention claimed is:

1. An apparatus for making a laminate assembly including a membrane and a compressible spacer, the apparatus comprising:
    first and second rollers positioned in a parallel opposed relationship and defining an inlet nip, the rollers being operative to rotate in a cooperative manner;
    means for controllably rotating at least one of the rollers;
    a first holder for holding a length of a strip of a membrane having an adhesive surface wherein the adhesive surface is covered by a release sheet;
    a cutter disposed between the first holder and the inlet nip, the cutter being operative to cut through at least a portion of the release sheet as the membrane is drawn from the first holder to the inlet nip;
    a second holder for holding a length of a strip of spacer material;
    a surface treater disposed between the first holder and the inlet nip, the surface treater being operative to apply a surface treatment to the spacer material as the spacer material is drawn from the second holder to the inlet nip; and
    a first platform disposed between the inlet nip and the first holder, the first platform including a surface for supporting the membrane and first and second sidewalls for laterally restraining opposing edges of the strip membrane, wherein the cutter is disposed through the surface of the first platform;
    wherein the first and second rollers are further operative to simultaneously receive and contact the membrane and the spacer material at the inlet nip in a known spaced relationship and apply a compressive force thereto.

2. The apparatus of claim 1, further comprising:
    a first drive roller disposed between the inlet nip and the first holder, the first drive roller being operative to apply a pulling force to the strip of membrane.

3. The apparatus of claim 2, further comprising:
    a second drive roller disposed between the inlet nip and the second holder, the second drive roller being operative to apply a pulling force to the spacer material.

4. The apparatus of claim 3, wherein the first and second rollers, the first drive roller and the second drive roller are operative to turn in controlled relation to one another.

5. The apparatus of claim 3, further comprising:
    at least a first servo motor for controllably running at least one of the rollers, wherein the servo motor is a variable speed servo motor.

6. The apparatus of claim 1, further comprising:
    a second platform disposed between the inlet nip and the second holder, the second platform including a surface for supporting the spacer material and first and second sidewalls for laterally restraining opposing edges of the spacer material.

7. The apparatus of claim 1, wherein the cutter comprises:
    a cutting edge disposed between lateral edges of the membrane.

8. The apparatus of claim 7, wherein the cutter comprises:
    first and second cutting edges disposable between lateral edges of the membrane.

9. The apparatus of claim 1, wherein the pretreater comprises:
    a chemical bath, wherein the spacer material passes though the bath prior to being received at the inlet nip.

10. The apparatus of claim 1, wherein the pretreater comprises:
    an electrical surface treatment device.

11. The apparatus of claim 10, wherein the electrical surface treatment device comprises a first and second electrodes adapted to provide a carona discharge.

12. The apparatus of claim 1, further comprising:
    at least a first sensor disposed between the inlet nip and one of the first holder and the second holder, the sensor being operative to determine the presence or absence of one of the membrane and the spacer material.

13. The apparatus of claim 1, further comprising:
    a take-up roll operative to wind at least a portion of the release sheet removed from the membrane.

* * * * *

UNITED STATES PATENT AND TRADEMARK OFFICE
CERTIFICATE OF CORRECTION

PATENT NO. : 7,798,193 B2 Page 1 of 1
APPLICATION NO. : 11/556949
DATED : September 21, 2010
INVENTOR(S) : Ford It is certified that error appears in the above-identified patent and that said Letters Patent is hereby corrected as shown below:

Column 2, line 41, delete "is its" and insert therefor --it is--;
Column 8, line 6, delete "form" and insert therefor --from--;
Column 9, line 24, delete "form" and insert therefor --from--.

Signed and Sealed this

Thirtieth Day of November, 2010

David J. Kappos
*Director of the United States Patent and Trademark Office*